(12) United States Patent
Reidy

(10) Patent No.: US 8,408,642 B1
(45) Date of Patent: Apr. 2, 2013

(54) SEAT NET APPARATUS

(76) Inventor: Bryan L. Reidy, Chicago, IL (US)

( * ) Notice: Subject to any disclaimer, the term of this patent is extended or adjusted under 35 U.S.C. 154(b) by 0 days.

(21) Appl. No.: 13/134,973

(22) Filed: Jun. 22, 2011

Related U.S. Application Data

(60) Provisional application No. 61/399,212, filed on Jul. 8, 2010.

(51) Int. Cl.
*A47C 7/62* (2006.01)
(52) U.S. Cl. ............................. 297/188.01; 297/184.11
(58) Field of Classification Search ................. 224/275; 297/219.11, 188.01, 228.12, 229, 184.11, 297/487
See application file for complete search history.

(56) References Cited

U.S. PATENT DOCUMENTS

| | | | | |
|---|---|---|---|---|
| 4,790,592 A | * | 12/1988 | Busso et al. | 297/184.11 |
| 5,330,251 A | * | 7/1994 | McGuire | 297/229 |
| 5,529,341 A | * | 6/1996 | Hartigan | 280/749 |
| 5,795,009 A | * | 8/1998 | Sack et al. | 296/78.1 |
| 6,079,773 A | | 6/2000 | Hassan | |
| 6,382,720 B1 | * | 5/2002 | Franklin et al. | 297/228.13 |
| 6,516,844 B1 | * | 2/2003 | Henry | 150/167 |
| 6,648,410 B2 | * | 11/2003 | Sparks | 297/228.12 |
| 6,655,736 B1 | * | 12/2003 | Arenas | 297/229 |
| 6,742,837 B1 | * | 6/2004 | Alexander | 297/188.21 |
| 6,763,986 B2 | | 7/2004 | Santos et al. | |
| 7,309,102 B1 | | 12/2007 | Davis | |
| 7,757,734 B2 | * | 7/2010 | Hooker et al. | 150/167 |

* cited by examiner

*Primary Examiner* — Milton Nelson, Jr.
(74) *Attorney, Agent, or Firm* — Emery L. Tracy

(57) ABSTRACT

A retaining apparatus for retaining goods stored upon a vehicle seat in a vehicle is provided. The vehicle seat has a seat portion and a back portion with the seat portion having a front and a back and the back portion having a head rest. The retaining apparatus comprises a pouch having a first end, a second end, and an opening between the first end and the second end. A pouch securing mechanism secures the pouch to the front of the seat portion. A seat net is connected to the pouch within the opening. A seat net securing mechanism secures the other end of the seat net to the head rest wherein the seat net is alternatingly completely receivable within the pouch and extendable from the pouch to the head rest of the vehicle seat thereby creating a compartment between the seat net and the vehicle seat.

20 Claims, 2 Drawing Sheets

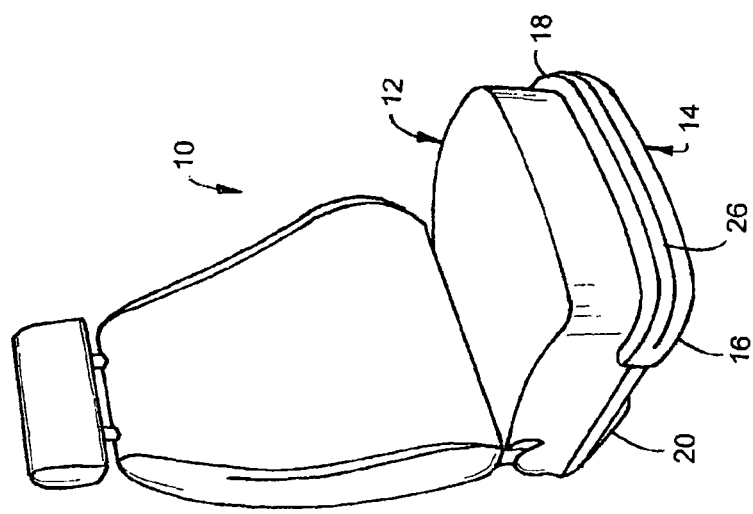
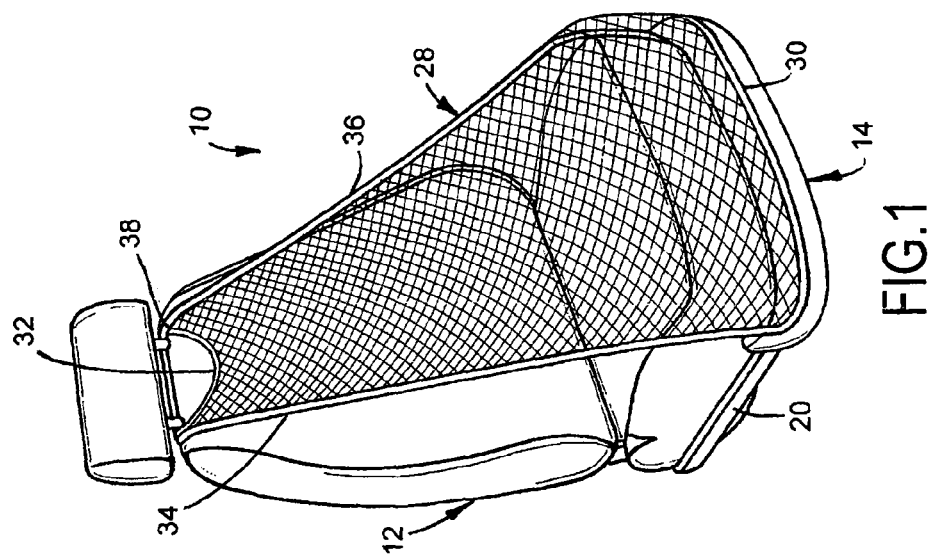

SEAT NET APPARATUS

The present application claims the benefit of priority of provisional patent application Ser. No. 61/399,212, filed on Jul. 8, 2010, entitled "Safety Seat Net".

BACKGROUND OF THE INVENTION

1. Field of the Invention

This invention relates generally to a seat net apparatus, more particularly, the invention relates to a seat net apparatus for use in automobiles and other vehicles for retaining goods stored upon the seat in a safe and reliable fashion.

2. Description of the Prior Art

Every day, millions of people climb into their automobiles and head off for a day of work, school, or recreation. Whether a busy executive traveling to an important business luncheon, a homemaker dropping the kids off at a school dance, or a professional delivery man making his rounds, automobiles offer people a simple and efficient means of traveling from one destination to the next. Before heading off on any journey, most people first grab personal items needed when spending time away from home. Wallets, house keys, and a cellular telephone are but a few of the countless personal items most people carry with them when on the go. In addition, bulky or oversize items such as an extra pair of shoes, a change of clothes, business samples or schoolbooks is all often stored within one's vehicle. Unfortunately, storing the various items needed when on the road can be a challenge. Loaded onto an empty passenger seat, these items can slide about during travel. Should the driver make a sudden stop, important documents and belongings can slide off the seat and onto vehicle flooring creating a sloppy mess. As can be imagined, arriving at an important business meeting, only to have to waste time assembling a disheveled portfolio can be a completely frustrating experience.

SUMMARY

The present invention is a retaining apparatus for retaining goods stored upon a vehicle seat in a vehicle. The vehicle seat has a seat portion and a back portion with the seat portion having a front and a back and the back portion having a head rest. The retaining apparatus comprises a pouch having a first end, a second end, and an opening between the first end and the second end. A pouch securing mechanism secures the pouch to the front of the seat portion. A seat net is connected to the pouch within the opening. A seat net securing mechanism secures the other end of the seat net to the head rest wherein the seat net is alternatingly completely receivable within the pouch and extendable from the pouch to the head rest of the vehicle seat thereby creating a compartment between the seat net and the vehicle seat.

In addition, the present invention includes a method for retaining goods stored upon a vehicle seat in a vehicle. The vehicle seat has a seat portion and a back portion with the seat portion having a front and a back and the back portion having a head rest. The method comprises providing a pouch having a first end, a second end, and an opening between the first end and the second end, securing the pouch to the front of the seat portion of the vehicle seat, providing a seat net, connecting the seat net to the pouch within the opening, completely positioning the seat net within the pouch, extending the seat net from the pouch to the head rest of the vehicle seat, securing the head rest connecting edge to the head rest of the back portion of the vehicle seat, and creating a compartment between the seat net and the vehicle seat.

The present invention further includes retaining apparatus for retaining goods stored upon a vehicle seat in a vehicle. The vehicle seat has a seat portion and a back portion with the seat portion having a front and a back and the back portion having a head rest. The retaining apparatus comprises a pouch having a first end, a second end, and a closable opening between the first end and the second end. A first strap extends from the first end of the pouch and a second strap extends from the second end of the strap with the first strap and the second strap wrapping around the seat portion. A fastening mechanism secures the first strap to the second strap in the back of the seat portion of the vehicle seat. A seat net is connected to the pouch within the opening. A loop of elastic material secures the head rest connecting edge to the head rest wherein the seat net is alternatingly completely receivable within the pouch and extendable from the pouch to the head rest thereby creating a compartment between the seat net and the vehicle seat.

BRIEF DESCRIPTION OF THE DRAWINGS

FIG. 1 is perspective view illustrating a seat net apparatus, constructed in accordance with the present invention, prior to deployment of a seat net;

FIG. 2 is a perspective view illustrating the seat net apparatus, constructed in accordance with the present invention, subsequent to deployment of the seat net;

DETAILED DESCRIPTION OF THE PREFERRED EMBODIMENTS

Figure 4:
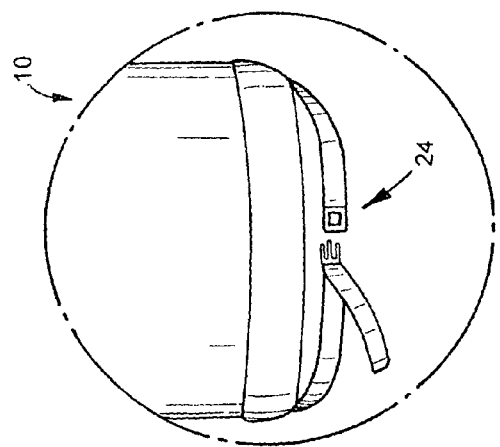
FIG. 4 is a perspective view illustrating a fastening mechanism for the seat net apparatus, constructed in accordance with the present invention.
Figure 3:
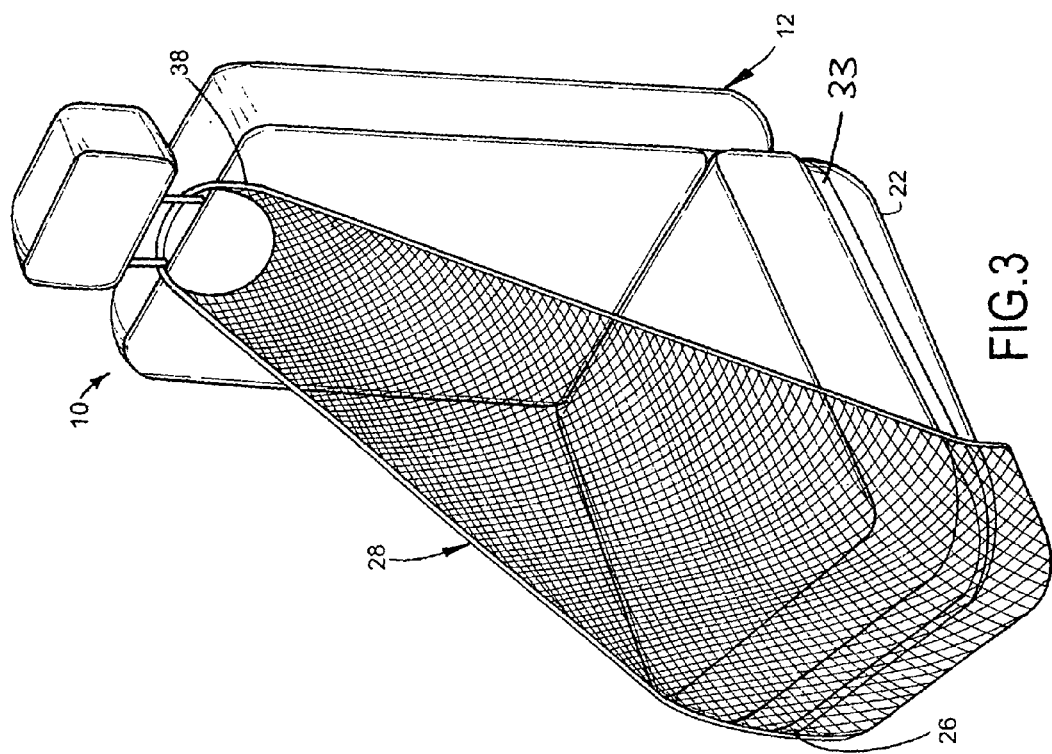
FIG. 3 is another perspective view illustrating the seat net apparatus, constructed in accordance with the present invention, subsequent to deployment of the seat net.

As illustrated in FIGS. 1-4, the present invention is a seat net apparatus, indicated generally at 10, for use in automobiles and other vehicles for retaining goods stored upon a vehicle seat 12 in a safe and reliable fashion. The seat net apparatus 10 of the present invention is a specially designed pouch-like retainer configured expressly for use in automobiles and designed specifically to encompass a passenger seat 12 thereby retaining goods stored upon the vehicle seat 12 in a safe and reliable fashion.

The seat net apparatus 10 of the present invention includes a pouch 14 having a first end 16 and a second end 18. A first strap 20 extends from the first end 16 of the pouch 14 and a second strap 33 extends from the second end 18 of the pouch 14. The first strap 20 and the second strap 22 wrap around the vehicle seat 12 and secured in place via a fastening mechanism 24. While preferably the fastening mechanism 24 is a tongue and groove buckle fastener, it is within the scope of the present invention to use any type of fastening mechanism 24 including, but not limited to, any type of buckle, snaps, hook and loop fasteners, buttons, adhesive between pouch 14 and vehicle seat 12 (do not need straps for this embodiment), etc., to releasably secure the first strap 20 to the second strap 22 and the pouch 14 to the vehicle seat 12. Also, preferably, the first strap 20 and the second strap 22 are constructed from a nylon material although constructing the first strap 20 and the second strap 22 from a different type of material is within the scope of the present invention. Further, it should be understood that the lengths of the first strap 20 and the second strap 22 are adjustable by the fastening mechanism 24 allowing the seat net apparatus 10 to accommodate the dimensions of the vehicle seat 12.

The pouch 14 of the seat net apparatus 10 of the present invention includes an elongated opening closable with a closing mechanism 26. In a preferred embodiment, the closing mechanism 26 is a zipper although other types of closing mechanisms 26 including, but not limited to, buckles, snaps, buttons, hook and loop fasteners, etc., are within the scope of the present invention.

Releasably contained within the pouch 14 of the seat net apparatus 10 of the present invention, just inside the opening of the pouch 14, preferably, is a seat net 28. Preferably manufactured of nylon mesh material, the seat net 28 has a pouch connecting edge 30, a head rest connecting edge 32 substantially opposite the pouch connecting edge 30, a first side edge 34 extending between the pouch connecting edge 30 and the head rest connecting edge 32, and a second side edge 36 opposite the first side edge 34 and extending between the pouch connecting edge 30 and the head rest connecting edge 32. When laid out flat, the seat net 28 has a generally, substantially, trapezoidal in shape with the pouch connecting edge 30 having a length at least as long as the width of the vehicle seat 12 (preferably longer, as will be described below) and the head rest connecting edge 32 having a length less than the pouch connecting edge 30. The first side edge 34 and the second side edge 36 angles toward each other from the pouch connecting edge 30 to the head rest connecting edge 32.

Connected to the head rest connecting edge 32 of the seat net apparatus 10 of the present invention is a loop 38 of material for releasably securing the head rest connecting edge 32 to the head rest of the vehicle seat 12. Preferably, the loop 38 is a stretchy, elastic looped fastener. As an additional feature, the pouch 14 has a width at least as long as the pouch connecting edge 30 of the seat net 28 and allows the seat net 28 to be compactly, completely stored out of the way within the pouch 14 until its use is necessary. In an embodiment of the present invention, the length of the pouch connecting edge 30 is longer than the width of the vehicle seat 12. This allows the seat net 28 to "wrap around" the front corners of the vehicle seat 12 thereby creating a compartment between the seat net 28 and the vehicle seat 12.

The pouch 14 of the seat net apparatus 10 of the present invention can also provide storage for small personal goods such as electronic equipment, cellular telephones, travel receipts, and other items. The seat net 28 can be produced in a myriad of colors to correspond with existing vehicle decors, as well as a variety of neutral hues.

The manner of use of the seat net apparatus 10 of the present invention will now be described. It will be understood by those skilled in the art that the manner of use of the seat net apparatus 10 described herein is merely one method of use and other methods of use of the seat net apparatus 10 are within the scope of the present invention.

Use of the seat net apparatus 10 of the present invention is simple and straight forward. The user first fastens the pouch 14 containing the seat net 28 at the front base of their passenger car seat 12 securing it with the tongue and groove clip 24 at the rear base of the vehicle seat 12. The user then is able to load the vehicle seat 12 with personal belongings such s file folders, purses, briefcases, grocery bags, or other goods. Once these items are in place, the user simply stretches the pouch-like seat net 28 over the vehicle seat 12, and their belongings, and secures the looped fastener 38 over the passenger seat headrest. The looped fastener 38 naturally retracts allowing for a snug and secure fit. The user then embarks on their trip, confident that all items stored on the vehicle seat 12 will be safely retained via the seat net 28. Upon arriving at their destination, the user then simply removes these items from under the seat net 28, replacing them again for their journey home.

The seat net apparatus 10 of the present invention offers users a number of significant benefits and advantages. Foremost, the seat net apparatus 10 provides users a simple and efficient means of securing the wide variety of objects needed during travel. An ample storage pouch easily secured to a vehicle passenger seat 12 and designed to expand the distance between the head rest and the front of the seat cushion, the seat net apparatus 10 enables users to store such items as infant accessories, sports gear, samples or other bulky or oversize items, with ease. Users will especially appreciate that with the seat net apparatus 10, items stored within remains secure during travel and can be easily accessed upon arrival. A practical alternative to portable aftermarket auto organizers which can easily shift and spill during travel, use of the seat net apparatus 10 ensures items can be organized and maintained in a neat and orderly manner.

The seat net apparatus 10 of the present invention offers users a simple way in which to secure the many items needed during travel. Sleek in design and durably constructed, the seat net apparatus 10 proves an invaluable commodity for any vehicle owner.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein may be suitably practiced in the absence of the specific elements which are disclosed herein.

What is claimed is:

1. A retaining apparatus for retaining goods stored upon a vehicle seat in a vehicle, the vehicle seat having a seat portion and a back portion, the seat portion having a front and a back, the back portion having a head rest, the retaining apparatus comprising:
    a pouch having a first end, a second end, and an opening between the first end and the second end;
    pouch securing means for securing the pouch to the front of the seat portion of the vehicle seat;
    a seat net having a pouch connecting edge, a head rest connecting edge substantially opposite the pouch connecting edge, a first side edge extending between the pouch connecting edge and the head rest connecting edge, and a second side edge opposite the first side edge and extending between the pouch connecting edge and the head rest connecting edge, the pouch connecting edge connected to the pouch within the opening; and
    seat net securing means for securing the head rest connecting edge to the head rest of the back portion of the vehicle seat;
    wherein the seat net is alternatingly completely receivable within the pouch and extendable from the pouch to the head rest of the vehicle seat thereby creating a compartment between the seat net and the vehicle seat.

2. The retaining apparatus of claim 1 wherein the pouch securing means includes a first strap extending from the first end of the pouch and a second strap extending from the second end of the strap, the first strap and the second strap adapted for wrapping around the seat portion of the vehicle seat, and further comprising:
    a fastening mechanism for securing the first strap to the second strap in the back of the seat portion or the vehicle seat.

3. The retaining apparatus of claim 2 wherein the fastening mechanism is a tongue and groove buckle fastener, the first strap and the second strap being tightenable to accommodate the size and dimension of the vehicle seat.

4. The retaining apparatus of claim 1 and further comprising:
    a closing mechanism for closing the opening in the pouch.

5. The retaining apparatus of claim 4 wherein the closing apparatus is a zipper.

6. The retaining apparatus of claim 1 wherein the head rest connecting edge has a length less than the pouch connecting edge and the first side edge and the second side edge angling toward each other from the pouch connecting edge to the head rest connecting edge.

7. The retaining apparatus of claim 1 wherein the seat net securing means is a loop of elastic material.

8. The retaining apparatus of claim 1 the seat net is adapted for wrapping around front corners of the vehicle seat adapted for creating the compartment between the seat net and the vehicle seat.

9. A method for retaining goods stored upon a vehicle seat in a vehicle, the vehicle seat having a seat portion and a back portion, the seat portion having a front and a back, the back portion having a head rest, the method comprising:
    providing a pouch having a first end, a second end, and an opening between the first end and the second end;
    securing the pouch to the front of the seat portion of the vehicle seat;
    providing a seat net having a pouch connecting edge, a head rest connecting edge substantially opposite the pouch connecting edge, a first side edge extending between the pouch connecting edge and the head rest connecting edge, and a second side edge opposite the first side edge and extending between the pouch connecting edge and the head rest connecting edge;
    connecting the pouch connecting edge to the pouch within the opening;
    completely positioning the seat net within the pouch;
    extending the seat net from the pouch to the head rest of the vehicle seat;
    securing the head rest connecting edge to the head rest of the back portion of the vehicle seat; and
    creating a compartment between the seat net and the vehicle seat.

10. The method of claim 9 and further comprising:
    extending a first strap from the first end of the pouch;
    extending a second strap from the second end of the strap;
    wrapping the first strap and the second strap around the seat portion of the vehicle seat; and
    securing the first strap to the second strap in the back of the seat portion of the vehicle seat.

11. The method of claim 10 and further comprising:
    securing the first strap to the second strap with a tongue and groove buckle fastener; and
    tightening the first strap and the second strap to accommodate the size and dimension of the vehicle seat.

12. The method of claim 9 and further comprising:
    closing the opening in the pouch.

13. The method of claim 12 and further comprising:
    providing a zipper.

14. The method of claim 9 wherein the head rest connecting edge has a length less than the pouch connecting edge and the first side edge and the second side edge angling toward each other from the pouch connecting edge to the head rest connecting edge.

15. The method of claim 9 and further comprising:
    securing the seat net to the head rest with a loop of elastic material.

16. The method of claim 9 wherein the length of the pouch connecting edge is longer than the width of the vehicle seat, and further comprising:
    wrapping the seat net around front corners of the vehicle seat to create the compartment between the seat net and the vehicle seat.

17. A retaining apparatus for retaining goods stored upon a vehicle seat in a vehicle, the vehicle seat having a seat portion and a back portion, the seat portion having a front and a back, the back portion having a head rest, the retaining apparatus comprising:
    a pouch having a first end, a second end, and a closable opening between the first end and the second end;
    a first strap extending from the first end of the pouch;
    a second strap extending from the second end of the strap, the first strap and the second strap adapted for wrapping around the seat portion of the vehicle seat;
    a fastening mechanism adapted for securing the first strap to the second strap in the back of the seat portion of the vehicle seat;
    a seat net having a pouch connecting edge, a head rest connecting edge substantially opposite the pouch connecting edge, a first side edge extending between the pouch connecting edge and the head rest connecting edge, and a second side edge opposite the first side edge and extending between the pouch connecting edge and the head rest connecting edge, the pouch connecting edge connected to the pouch within the opening; and
    a loop of elastic material adapted for securing the head rest connecting edge to the head rest of the back portion of the vehicle seat;
    wherein the seat net is alternatingly completely receivable within the pouch and extendable from the pouch to the head rest of the vehicle seat thereby creating a compartment between the seat net and the vehicle seat.

18. The retaining apparatus of claim 17 wherein the fastening mechanism is a tongue and groove buckle fastener, the first strap and the second strap being tightenable to accommodate the size and dimension of the vehicle seat.

19. The retaining apparatus of claim 17 wherein the head rest connecting edge has a length less than the pouch connecting edge and the first side edge and the second side edge angling toward each other from the pouch connecting edge to the head rest connecting edge.

20. The retaining apparatus of claim 17 wherein the seat net is adapted for wrapping around front corners of the vehicle seat and adapted for creating the compartment between the seat net and the vehicle seat.

* * * * *